(12) United States Patent
Wendt et al.

(10) Patent No.: US 7,518,285 B2
(45) Date of Patent: Apr. 14, 2009

(54) STARTING-PROCESS CONTROLLER FOR STARTING A PIEZOMOTOR

(75) Inventors: Matthias Wendt, Würselen (DE); Hans Steinbusch, Landgraaf (DE); Gerhard Diefenbach, Aachen (DE); Christian Reichinger, Neutraubling (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/512,119

(22) PCT Filed: Apr. 17, 2003

(86) PCT No.: PCT/IB03/01442

§ 371 (c)(1),
(2), (4) Date: Oct. 21, 2004

(87) PCT Pub. No.: WO03/092149

PCT Pub. Date: Nov. 6, 2003

(65) Prior Publication Data

US 2005/0281546 A1      Dec. 22, 2005

(30) Foreign Application Priority Data

Apr. 26, 2002   (DE) ............................... 102 18 565

(51) Int. Cl.
   *H01L 41/09*   (2006.01)
(52) U.S. Cl. ..................................................... 310/317
(58) Field of Classification Search .................. 310/317, 310/318
   See application file for complete search history.

(56) References Cited

U.S. PATENT DOCUMENTS

| 4,965,532 | A | * | 10/1990 | Sakurai ......................... 331/4 |
| 5,159,223 | A | | 10/1992 | Suganuma |
| 5,508,579 | A | | 4/1996 | Suganuma |
| 5,595,330 | A | * | 1/1997 | Buice et al. .................. 228/102 |
| 5,661,359 | A | * | 8/1997 | Katsuragawa .......... 310/316.01 |
| 6,396,192 | B2 | | 5/2002 | Morales Serrano et al. ...................... 310/316.01 |
| 6,569,109 | B2 | * | 5/2003 | Sakurai et al. ................. 601/2 |
| 2001/0043025 | A1 | | 11/2001 | Morales Serrano et al. |
| 2002/0171410 | A1 | * | 11/2002 | Akahane et al. .......... 324/76.49 |

FOREIGN PATENT DOCUMENTS

DE    19942269 A1    3/2001
JP    01209967 A     8/1989

* cited by examiner

*Primary Examiner*—Quyen P Leung
*Assistant Examiner*—Derek J Rosenau

(57) ABSTRACT

A starting-process controller for starting a piezomotor, having a voltage-controlled oscillator, a power output stage, and a resonant converter. The oscillator generates the control signals required for the power output stage and the resonance converter converts the stepped output voltage from the power output stage into a sinusoidal voltage at the output. The resonance converter drives the piezomotor with the voltage. The motor current that flows when the piezomotor is driven is measured and compared with the phase of the drive voltage in a phase comparator. The comparison output signal is a measure of the phase difference at the time between current and voltage. A phase-locked loop filter smoothes the phase-difference signal for controling the oscillator. The controller includes a start-assisting circuit element that fixes the output voltage from the phase-locked loop filter at start-up and thus applies a constant voltage to the input of the voltage-controlled oscillator.

18 Claims, 4 Drawing Sheets

STARTING-PROCESS CONTROLLER FOR STARTING A PIEZOMOTOR

BACKGROUND OF THE INVENTION

The invention relates to a starting-process controller having a voltage-controlled oscillator (VCO), a power output stage, and a resonance converter, wherein the voltage-controlled oscillator (VCO) generates the control signals required for the power output stage, the resonance converter converts the stepped output voltage from the power output stage into a sinusoidal voltage at its output, the piezomotor is driven by the sinusoidal voltage from the resonance converter, the motor current that flows when the piezomotor is driven is measured and compared with the phase of the drive voltage in a phase comparator, the output signal from the phase comparator is a measure for the phase difference at the time between current and voltage, a phase-locked loop filter smoothes the phase-difference signal, the smoothed signal controls the oscillator (VCO).

Known from DE 199 42 269 is an electronic drive for a piezomotor (e.g. a micropush motor). The piezomotor is connected to a phase-regulated a.c. voltage. During operation, the current drawn by the piezomotor is measured by means of a diode. The phase angle of the current is detected by comparison with the voltage fed to the motor. A peculiarity of the piezomotor is that the current through the motor, and hence the power drawn by it, decreases under load. This contrasts with electromagnetic drive systems where the current increases under load.

This peculiarity of the piezomotor is attributable to a rise in the internal resistances of the system.

Hence, when a piezomotor and its drive system are being designed, it has to be borne in mind that the current, or rather the applied motor voltage, has to be corrected when operating under load and the motor power adjusted to the load in this way.

Another known effect is that, if there is a changing, i.e. variable load, then this will change the resonant frequency of the motor at the same time. This, once again, causes the active power drawn by, and the efficiency of, the motor to decrease. The two effects described reinforce one another such that the motor may possibly come to a halt. At the same time, the phase-regulating system goes to a self-locked state, from which it generally does not recover. An automatic restart is no longer possible. The reason for this tip-over or stalling effect is that the oscillator is taken from the capacitive range of operation through its resonance and into the inductive range, which causes a phase rotation.

SUMMARY OF THE INVENTION

It is an object of the invention to ensure a stable and reliable starting under different loads.

This object is achieved in accordance with the invention by two variant embodiments that are defined in claims 1 and 10 and that can be used separately but may also be combined with one another.

The first variant embodiment, which is defined in claim 1, is characterized by a start-assisting switching element that fixes the output voltage of the phase-locked loop filter at start-up and thus applies a constant voltage to the input of the voltage-controlled oscillator (VCO).

The introduction of this start-assisting switching element has the advantage that the motor frequency supplied by the oscillator (VCO) is set to a safe operating frequency. Without the said start-assisting switching element and the effect described for it, the control frequency would be moved through its control range by the phase-regulating system too quickly when starting under load and would take the control loop to the self-locked state before the motor could start the load moving.

Other advantageous modifications of the first embodiment can be seen from the subclaims dependent on claim 1. These modifications relate to the design of the start-assisting element that switches a switching element, and to the connecting-in period that is suitable.

The second variant embodiment, which is defined in claim 10, is characterized by an adjustable time-delay element by which the phase angle between the voltage applied to the motor and the motor current is changed in start-up operation from an initially large starting angle for a safe and reliable breakaway towards a smaller angle at the operating point, so that start-up will be completed safely and reliably irrespective of the loading condition.

The curve followed by the change in phase-angle can be freely preset. It depends on the load and on the resonant frequency required for optimal efficiency at rated speed. It must be set in such a way that the power drawn by the motor remains in the capacitive range and hence the value for the resonant frequency is not exceeded.

These and other aspects of the invention are apparent from and will be elucidated with reference to the embodiments described hereinafter. In the drawings:

DETAILED DESCRIPTION OF THE INVENTION

Figure 1:
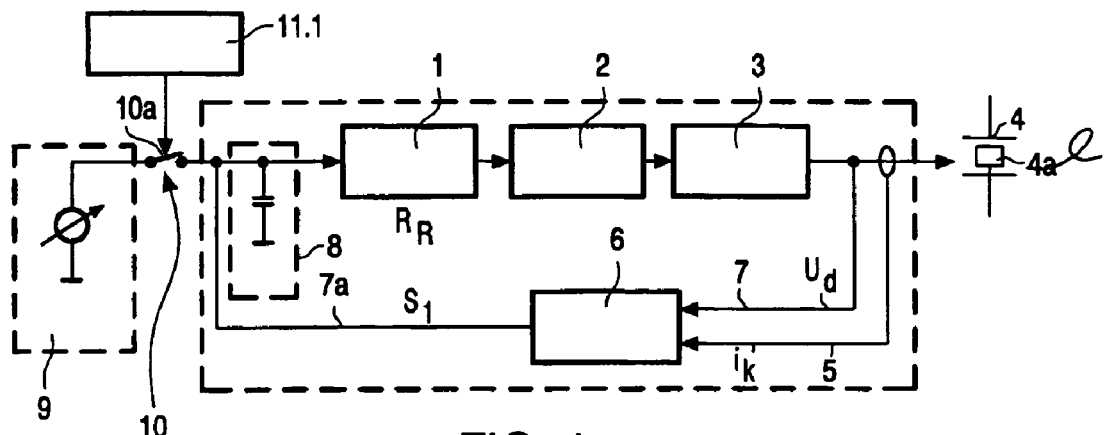
FIG. 1 is a block circuit diagram of the first embodiment in which, to start the motor, use is made of a starting-process circuit that feeds an assured voltage to a process frequency-generator by means of a starting-value presetting circuit and a phase-locked loop filter.

Shown in FIG. 1 is a first embodiment of the starting-process controller for starting a piezomotor, the controller having a voltage-controlled oscillator 1 (VCO), a power output stage 2, and a resonance converter 3. The resonance converter 3 converts a stepped output voltage from the power output stage 2 into a sinusoidal voltage at the output of the resonance converter 3. The oscillator 1 (VCO) generates the control signals required for the power output stage 2. The piezomotor 4 is driven by the sinusoidal voltage from the resonance converter. The motor current $i_k$ that flows in a line 5 when this is done is measured. The value $i_k$ of the current is compared in a phase comparator 6 with the phase of the drive voltage $U_d$ on a line 7. The output signal $s_l$ from the phase comparator 6 on a line 7a is a measure for the phase difference at the time between current and voltage. A phase-locked loop filter 8 smoothes the phase-difference signal, and the smoothed signal controls the oscillator 1 (VCO).

The voltage from the loop filter 8 may drop at the time of start-up. This is undesirable. For this reason, there is a starting-value presetting circuit 9 provided that is connected at the start-up time and ensures that the voltage from the loop filter 8 is held constant during the starting process. A start-assisting switching element 10 driven by a starting-process controller 11.1 is responsible for connecting-in the starting-value presetting circuit 9. For this purpose, the start-assisting switching element 10 connects the starting-value presetting circuit 9 to the loop filter 8 with the help of the starting-process controller 11.1 until such time as the oscillator 1 is operating in a steady state.

Figure 2:
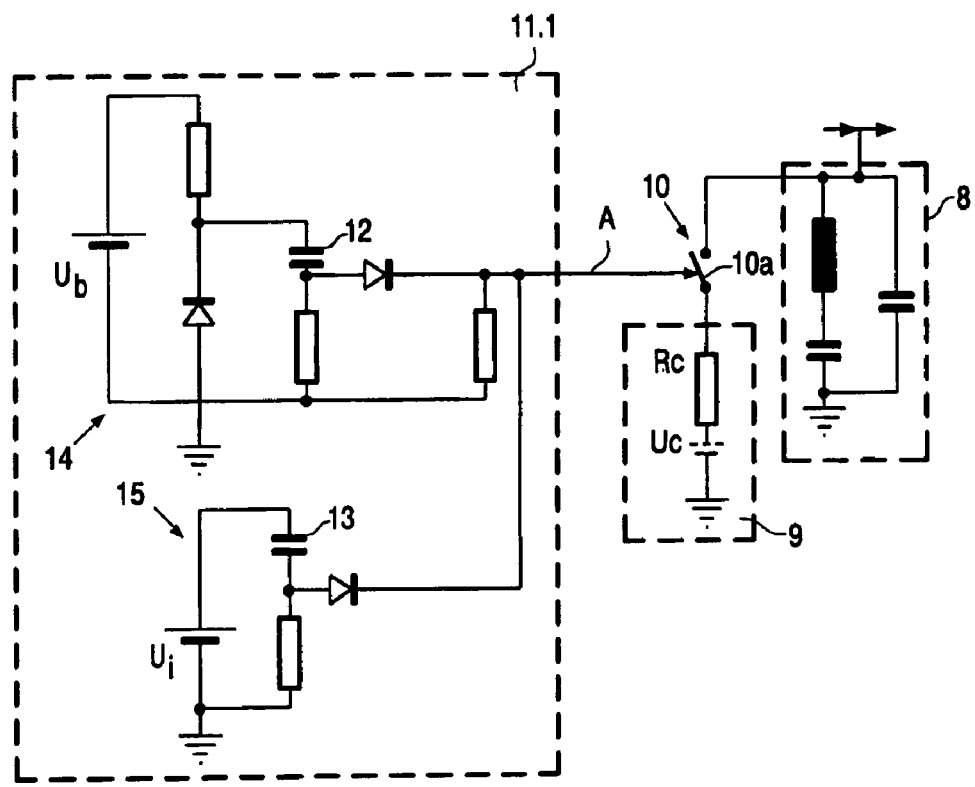
FIG. 2 is a somewhat more specific block circuit diagram relating to the cooperation of the starting-process control circuit, the starting-value presetting circuit, and the loop filter.

FIG. 2 shows an example of how the starting-process controller 11.1, the starting-value presetting circuit 9, and the loop filter 8 may be constructed. Shown on the left-hand side is a possible design for the starting-process controller 11.1. Shown on the right-hand side of the Figure is the loop filter 8. Between the two is the starting-value presetting circuit 9 and the start-assisting switching element 10.

The starting-value presetting circuit 9 generally comprises a resistor $R_c$ and a voltage source $U_c$. The voltage from the voltage source $U_c$ is selected such that, at it, the oscillator 1 generates the optimum breakaway frequency. The resistance of the resistor $R_c$ is selected such that it is far smaller than the output impedance of the phase comparator 6. The construction of the loop filter 8 and its dimensioning are described in the conventional data sheets for PLL modules. The start-assisting switching element 10 comprises the starting-value presetting circuit 9, and a switching element 10a that is responsible for connecting the starting-value presetting circuit 9 to the loop filter 8. In the simplest version, a resistor $R_R$ alone (FIG. 1) may be connected in parallel with the loop filter 8.

The two supply voltages $U_b$ and $U_1$ having been switched on for the purpose of starting the motor, the start-assisting switching element 10 is switched in by an activating signal that comes from the starting-process controller 11.1 via a line A. The activating signal thereby causes the motor to break away. At the same time, the capacitors 12, 13 of the two timers 14, 15 are charged. When the activating signal has reached the threshold voltage of the start-assisting element 10, the starting-value presetting circuit 9 is disconnected by means of the switching element 10a.

Figure 3:
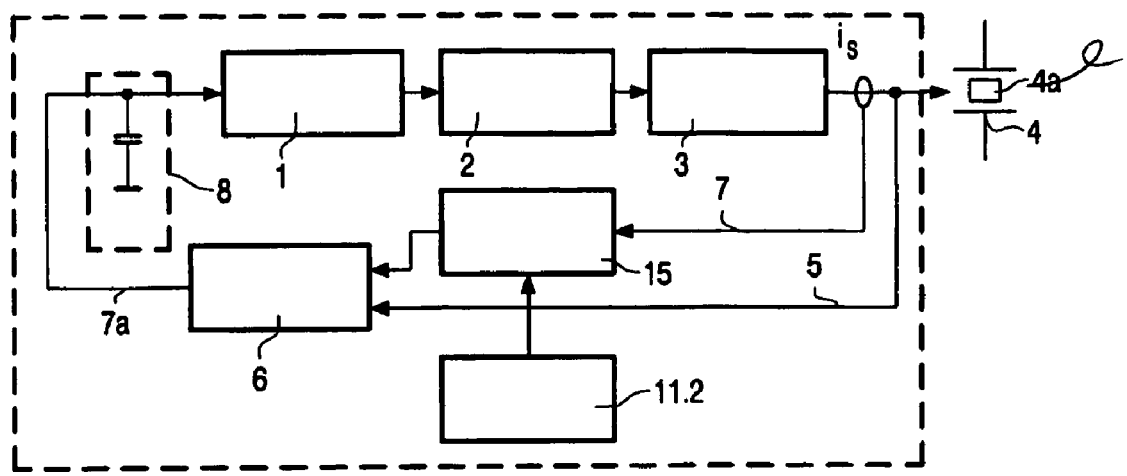
FIG. 3 is a block circuit diagram of the second embodiment, in which the start-up behavior is affected by an adjustable time-delay element that sets, or rather adjusts, the phase-angle at the time of start-up.

The second embodiment of the invention operates with a phase-shifting arrangement. This starting-process controller, which is shown in FIG. 3, once again employs a voltage-controlled oscillator 1 (VCO), a power output stage 2, and a resonance converter 3 for starting the piezomotor 4. The resonance converter 3 converts the stepped output voltage from the power output stage 2 into a sinusoidal voltage at the output of the resonance converter 3. An essential part of the present embodiment is an adjustable timer 15, a time-delay element by which the phase angle between the voltage applied to the motor and the motor current is changed in start-up operation from an initially large starting angle for safe and reliable breakaway towards a smaller angle at the operating point, so that start-up will be completed safely and reliably irrespective of the loading condition.

The oscillator 1 generates the requisite control signals for the power output stage 2. The piezomotor 4 is driven by the sinusoidal voltage from the resonance converter 3. The motor current $i_s$ that flows when this is done is measured. The current value phase-shifted by the adjustable, programmable timer 15 is compared in the phase comparator 6 with the phase of the drive voltage. The delay preset for the timer 15 is supplied by the starting-process controller 11.2. The output signal from the phase comparator 6 is a measure for the phase difference at the time between current and voltage. The loop filter 8 smoothes the phase-difference signal, and the smoothed signal controls the oscillator 1.

Figure 4:
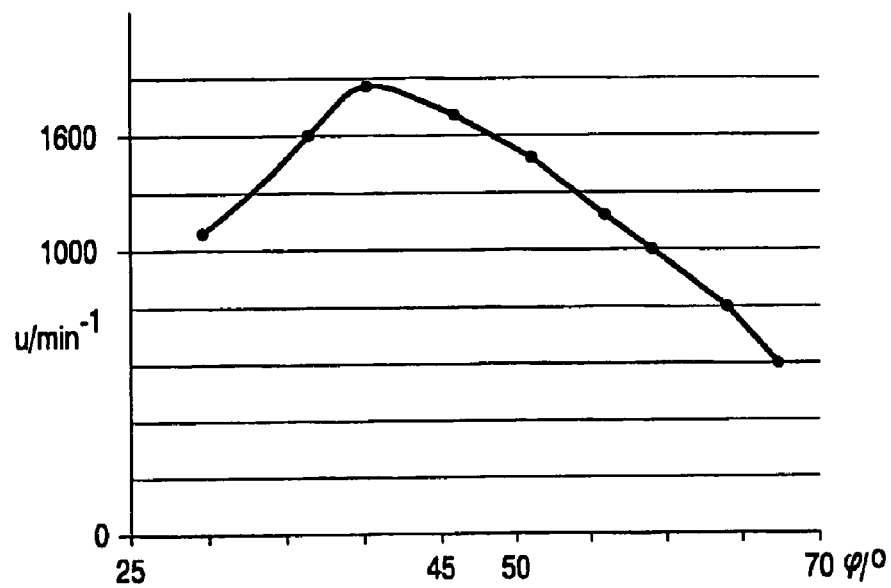
FIG. 4 is a graph showing speed of rotation plotted against phase angle.

FIG. 4 is a graph showing the optimum operating angle for a piezomotor. An angle of, for example, 40° can be read off from FIG. 4 for the rated speed (operating point). A safe start under load can be guaranteed at a phase angle of >600.

Figure 5:
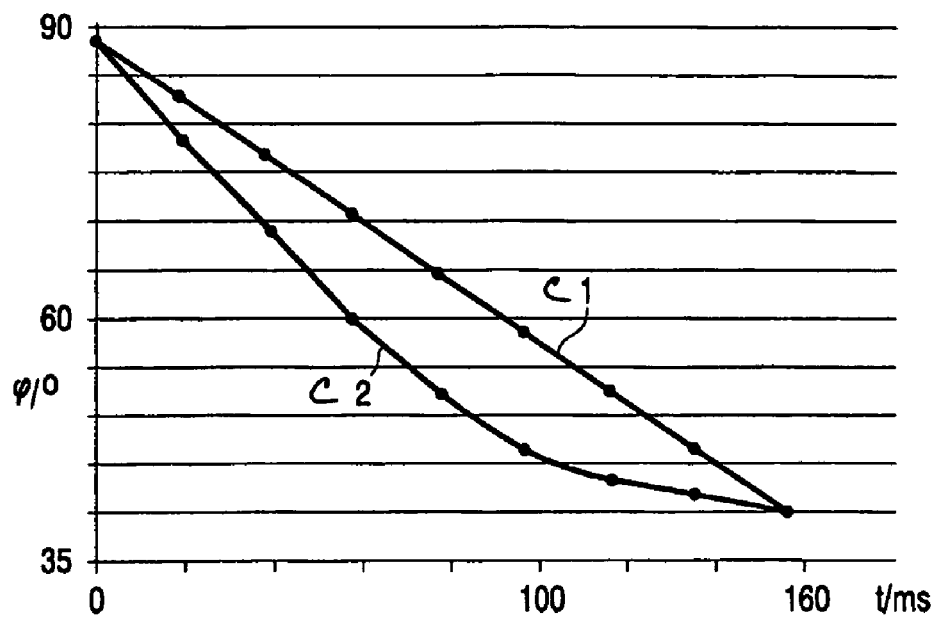
FIG. 5 is a graph showing phase angle plotted against time.

In FIG. 5, two start-up curves are shown by way of example for the preset angle against time. c1 shows a linear gradient. There is a danger in this case that the change of angle (angular increment) will be too fast in the load region that is critical (near the operating point). c2 follows a path that overcomes the problem described above. Close to the target angle defined, the changes set for the phase angle per increment of time become smaller. Also, because of the progressive curve followed by the angular value that is preset, operation at high efficiency is achieved more quickly in the initial start-up phase. The reduction in phase-angle during start-up may be in the form of a ramp. Similarly, the reduction in phase-angle during the start-up process may be effected by means of a digital counter 15a. The value from which the counter starts advantageously defines the phase angle in this case. It is also possible for the starting process to be determined by means of the counter. The starting process may also be determined by means of a counter 11a.

Figure 6:
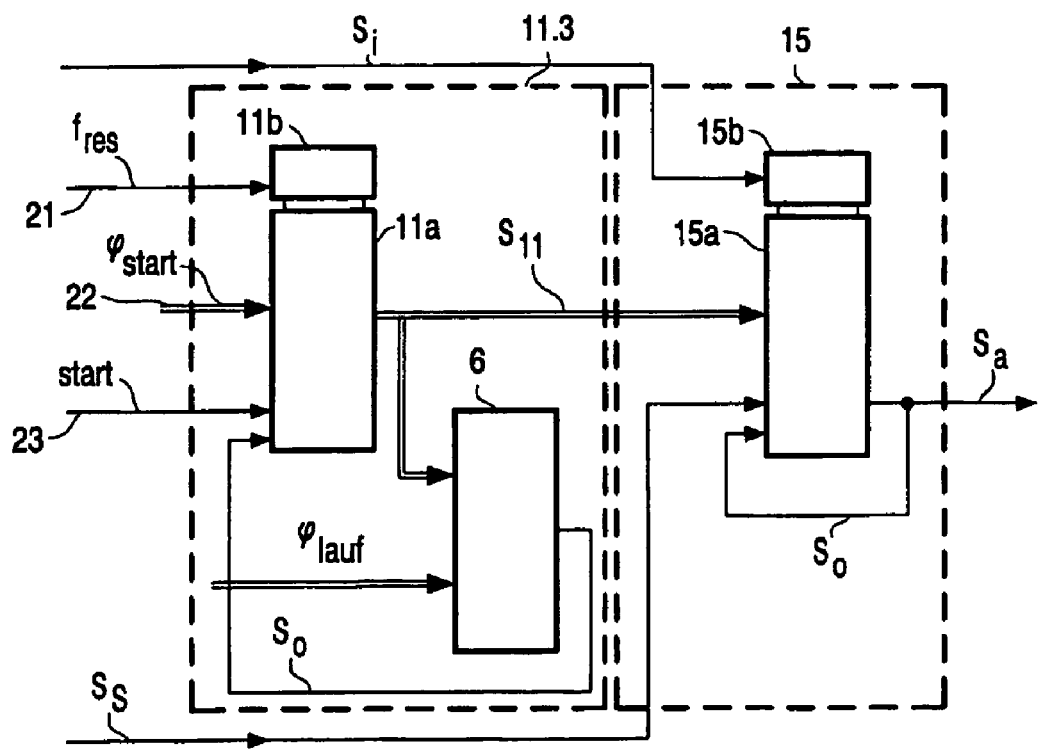
FIG. 6 is a block circuit diagram showing an arrangement in which the phase angle is varied linearly over time.

FIG. 6 shows, by way of example, a circuit that produces the form of c1 shown in FIG. 5. The left-hand half of the FIG. shows the starting-process controller 11.3 and the right-hand half shows the programmable delay element 15. Forming part of the starting-process controller 11.3 is a binary counter ha, having a clock-signal input 11b to which a signal of a frequency $f_{res}$ equal to the VCO frequency is fed via a line 21. Provided therebelow is the binary counter 11a, to which a φ-start signal is fed via a line 22 and a start signal via a line 23. Forming part of the programmable timer 15 is a counter 15a having a clock-signal input 15b.

The counter 11a in the starting-process controller 11.3 has a timing interval that can be preset at a fixed value; it is able to count single or multiple oscillations. In the same way, the counter 11a can count oscillations of a reference frequency forming a clock signal. The counts made by counter 11a are used directly for setting the phase delay and are also converted into the value set for the phase delay. The counter 11a starts from a given value that represents the phase-shift angle that allows safe and reliable start-up (see FIG. 4). Starting from this value, counter 11a counts down at each count pulse; it is connected to counter 15a. From the connecting line $S_{11}$, a line branches off to a comparator 6. The comparator 6 stops the counting process the moment counter 11a reaches the final count that has been preset. The final count is selected such that an optimum operating angle obtains. This means that in each starting process, counter 11a counts once from the preset starting value to the final count.

The counter 15a in the programmable timer 15 is started when the current signal $s_s$ passes through zero. This is done by setting it to the preset value supplied by the starting-process controller 11.3. Starting from this value, the counter 15a counts down until it stops at a count of "0". This process is repeated each time the motor current passes through zero. The output signal $s_a$ from the timer 15 acts as a stopping signal $s_o$ for counter 15a. This achieves that the signal for the passage through zero of the motor current is passed on with a delay. The preset clock frequency $s_i$ for the delay element 15 is supplied by, for example, a quartz oscillator.

Figure 7:
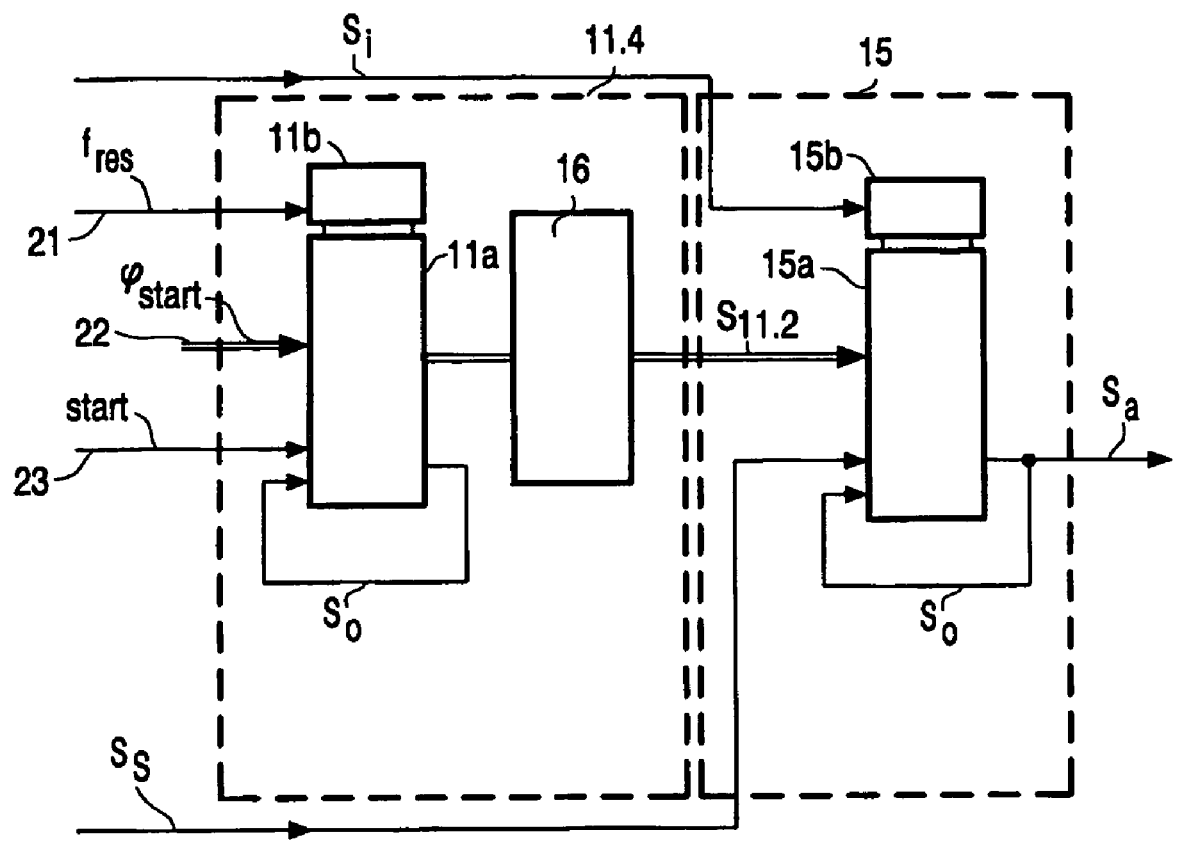
FIG. 7 is a block circuit diagram of an arrangement in which the phase angle is varied over time by means of a value table.

FIG. 7 shows, by way of example, a circuit that produces the form of curve 2 shown in FIG. 5. The left-hand half of the Figure shows the starting-process controller 11.4 and the right-hand half shows the programmable timer 15, to which there is no change as compared with Fig 6. Forming part of the starting-process controller 11.4 is a binary counter 11a having a clock-signal input 11b. A signal of a frequency $f_{res}$ equal to the VCO frequency is fed to the clock-signal input 11b via a line 21. A θ-start signal is fed to binary counter 11a via a line 22 and a start signal is fed to it via a line 23. Also shown is a value table 16. Forming part of the programmable timer 15 is a counter 15a having a clock-signal input 15b.

The counter 11a in the starting-process controller 11.4 has a timing interval that can be preset at a fixed value. It starts from a given value that represents the number of values in the value table 16. Starting from this value, counter 11a counts down, for example, until it stops at a count of "0". This means that in each starting process, counter 11a counts once from the preset starting value to the final count of "0". By means of the table 16, the counts are converted into settings for the phase delay in a memory device (RAM or ROM). Stored in the value table 16 are the individual binary values that the timer 15 needs for the desired phase shifts. The first value represents the phase shift that allows safe and reliable start-up. The start-up process is advantageously monitored in this case by a programmable control device, such as a microprocessor (not shown) or a DSP. The processor can monitor the phase delay digitally. The final value for the phase shift is so selected that an optimum operating angle is set.

The counter 15a of the programmable delay element 15 is started by the current signal $s_s$. This is done by setting it to the preset value supplied by the starting-process controller 11.4. This process is repeated each time the motor current passes through zero. The output signal $S_{11.2}$ from the starting-process controller 11.4 is the stopping signal for counter 15a. This achieves that the signal for the passage through zero of the motor current is passed on with a delay.

The preset clock frequency $s_i$ for the timer 15 is supplied by, for example, a quartz oscillator.

The invention claimed is:

1. A starting-process controller for starting a piezomotor, comprising:
   a voltage-controlled oscillator (VCO), a power output stage, a resonance converter, a phase comparator, a phase-locked loop filter and an adjustable time-delay element, wherein
   the VCO generates the control signals required for the power output stage,
   the power output stage provides stepped output voltage,
   the resonance converter converts the stepped output voltage from the power output stage into a motor voltage for driving the piezomotor, the motor voltage being sinusoidal and having an associated motor current when the piezomotor is driven,
   the phase comparator compares the motor current with the phase of the motor voltage, and provides a phase-difference signal representing a measure of the phase difference between motor current and the motor voltage,
   the phase-locked loop filter is configured to smooth the phase-difference signal so as to provide a smoothed signal that controls the VCO, and
   the adjustable time-delay element providing for controlled reduction of the phase difference between the motor voltage and the motor current in a start-up process for starting up the piezomotor from a large starting angle at initiation of the start-up process towards a smaller operating angle at an operating point, the adjustable time-delay element effecting the reduction in the form of one of: (i) a preset linear gradient, the linear gradient having a preset starting delay, a preset final delay and a preset, fixed change in delay per selected time increment over the duration of the start-up process, such that, at initiation of the start-up process, the starting delay applies to generate a start-up phase angle toward enabling reliable start up of the piezomotor and, at the operating point, the final delay applies to generate an operating phase angle toward enabling reliable operation of the piezomotor, or (ii) a preset progressive curve, the progressive curve having a preset starting delay, a preset final delay and a preset, varying change in delay per selected time increment over the duration of the start-up process, such that, at initiation of the start-up process, the starting delay applies to generate a start-up phase angle toward enabling reliable start up of the piezomotor, and, as the operating point is neared, the change in delay per selected time increment becomes progressively smaller and, at the operating point, the final delay applies to generate an operating phase angle toward enabling reliable operation of the piezomotor, or (iii) a preset combination of a linear gradient and a progressive curve, wherein an output of the adjustable time-delay element is directly connected to an input of the phase comparator.

2. The starting-process controller of claim 1, wherein the adjustable time-delay element comprises a digital counter, and wherein the digital counter effects the controlled reduction in phase angle between the motor voltage and the motor current in the form of the linear gradient, the progressive curve or the combination of such gradient and curve.

3. The starting-process controller of claim 2, wherein, at selected times during the start-up process, the digital counter has respective starting values such that the starting value of the digital counter at a particular selected time fixes the respective delay as to the motor current, the delay generating a phase angle at such selected time.

4. The starting-process controller of claim 3, wherein the digital counter counts from each starting value to a preset final count, the final count being associated with the passing on of the motor current subject to the respective delay.

5. The starting-process controller of claim 3, further comprising a start-up process delay controller, the start-up process delay controller controlling the adjustable time-delay element by one or both of (i) providing the starting values to the digital counter of the adjustable time-delay element and/or (ii) having a timing interval associated with the selected time increment between changes in delay.

6. The starting-process controller of claim 1, further comprising a start-up process delay controller, the start-up process delay controller controlling the adjustable time-delay element by one or both of (i) providing one or more of the starting delay, the final delay and/or the change in delay and/or (ii) having a timing interval associated with the selected time increment between changes in delay.

7. The starting-process controller of claim 6, wherein the start-up process delay controller comprises a reference counter that counts oscillations of a reference frequency, the reference frequency forming a clock signal of the reference counter.

8. The starting-process controller of claim 7, wherein the counts made by the reference counter are used directly for setting the delay.

9. The starting-process controller of claim 7, wherein the counts made by the reference counter are converted into a value for setting the delay.

10. The starting-process controller of claim 7, wherein the counts made by the reference counter are converted into settings for the delay by means of a table of a memory device.

11. The starting-process controller of claim 1, wherein the starting process is monitored by a programmable control device.

12. The starting-process controller of claim 11, wherein the programmable control device monitors the phase delay digitally.

13. The starting-process controller of claim 1, wherein during an initial start-up period of the piezomotor, the adjustable time-delay element is adapted to adjust the delay amount linearly from a preset start-up delay value to a preset final delay value, the adjustable time-delay element being further adapted to provide a preset, fixed change in the delay amount per selected time increment over a duration of the initial start-up period.

14. The starting-process controller of claim 13, wherein the adjustable time-delay element comprises:
a binary counter adapted to load a count value corresponding to the preset start-up delay value and to receive a clock signal corresponding to a frequency of the VCO, and to provide a counter output value that changes linearly at each cycle of the clock signal;
a programmable counter adapted to receive the motor current and to load the counter output value from the binary counter in response to the motor current, and is further adapted to receive a clock signal, to count in response to the clock signal, and to output the delayed motor current; and
a comparator adapted to receive the counter output value and a value corresponding to the preset final delay value, to compare the counter output value to the preset final delay value, and to output a stop signal to the binary counter to disable further counting when the counter output value equals the preset final delay value.

15. The starting-process controller of claim 1, wherein during an initial start-up period of the piezomotor, the adjustable time-delay element is adapted to adjust the delay value along a progressive curve from a preset start-up delay value to a preset final delay value such that a change in the delay value per selected time increment is greater at a beginning of the initial start-up period and is less at an end of the initial start-up period.

16. The starting-process controller of claim 15, wherein the adjustable time-delay element comprises:
a binary counter adapted to load a count value corresponding to the preset start-up delay value and to receive a clock signal corresponding a frequency of the VCO, and to provide a counter output value that changes at each cycle of the clock signal;
a look-up table adapted to receive the count value from the binary counter and to an output a table value corresponding to the received count value, the look-up table being adapted to map the count value to the table value such that the delay is adjusted along the progressive curve from the preset start-up delay value to the preset final delay value such that the change in delay per selected time increment is greater at the beginning of the initial start-up period and is less at the end of the initial start-up period; and
a programmable counter adapted to receive the motor current and to load the output table value from the look-up table in response to the motor current, and is further adapted to receive a clock signal, to count in response to the clock signal, and to output the delayed motor current.

17. A starting process controller for starting a piezomotor, comprising:
a voltage-controlled oscillator (VCO), a power output stage, a resonance converter, a phase comparator, a phase-locked loop filter and an adjustable time-delay element, wherein
the VCO generates the control signals required for the power output stage,
the power output stage provides stepped output voltage,
the resonance converter converts the stepped output voltage from the power output stage into a motor voltage for driving the piezomotor, the motor voltage being sinusoidal and having an associated motor current when the piezomotor is driven,
the phase comparator compares the motor current with the phase of the motor voltage, and provides a phase-difference signal representing a measure of the phase difference between motor current and the motor voltage,
the phase-locked loop filter is configured to smooth the phase-difference signal so as to provide a smoothed signal that controls the VCO, and
the adjustable time-delay element providing for controlled reduction of the phase difference between the motor voltage and the motor current in a start-up process for starting up the piezomotor from a large starting angle at initiation of the start-up process towards a smaller operating angle at an operating point, the adjustable time-delay element effecting the reduction in the form of one of: (i) a preset linear gradient, the linear gradient having a preset starting delay, a preset final delay and a preset, fixed change in delay per selected time increment over the duration of the start-up process, such that, at initiation of the start-up process, the starting delay applies to generate a start-up phase angle toward enabling reliable start up of the piezomotor and, at the operating point, the final delay applies to generate an operating phase angle toward enabling reliable operation of the piezomotor, or (ii) a preset progressive curve, the progressive curve having a preset starting delay, a preset final delay and a preset, varying change in delay per selected time increment over the duration of the start-up process, such that, at initiation of the start-up process, the starting delay applies to generate a start-up phase angle toward enabling reliable start up of the piezomotor, and, as the operating point is neared, the change in delay per selected time increment becomes progressively smaller and, at the operating point, the final delay applies to generate an operating phase angle toward enabling reliable operation of the piezomotor, or (iii) a preset combination of a linear gradient and a progressive curve, wherein the adjustable time-delay element delays only one of the motor voltage and the motor current, and provides the delayed one of the motor voltage and the motor current to the input of the phase comparator.

18. A starting-process controller for starting a piezomotor, comprising:
a voltage-controlled oscillator (VCO), a power output stage, a resonance converter, a phase comparator, a phase-locked loop filter and an adjustable time-delay element, wherein
the VCO generates the control signals required for the power output stage,
the power output stage provides stepped output voltage,
the resonance converter converts the stepped output voltage from the power output stage into a motor voltage for driving the piezomotor, the motor voltage being sinusoidal and having an associated motor current when the piezomotor is driven, the phase comparator compares the motor current with the phase of the motor voltage, and provides a phase-difference signal representing a measure of the phase difference between motor current and the motor voltage, the phase-locked loop filter is configured to smooth the phase-difference signal so as to provide a smoothed signal that controls the VCO, and the adjustable time-delay element providing for controlled reduction of the phase difference between the motor voltage and the motor current in a start-up process for starting up the piezomotor from a large starting angle at initiation of the start-up process towards a smaller operating angle at an operating point, the adjustable time-delay element effecting the reduction in the form of one of: (i) a preset linear gradient, the linear gradient having a preset starting delay, a preset final delay and a preset, fixed change in delay per selected time increment over the duration of the start-up process, such that, at initiation of the start-up process, the starting delay applies to generate a start-up phase angle toward enabling reliable start up of the piezomotor and, at the operating point, the final delay applies to generate an operating phase angle toward enabling reliable operation of the piezomotor, or (ii) a preset progressive curve, the progressive curve having a preset starting delay, a preset final delay and a preset, varying change in delay per selected time increment over the duration of the start-up process, such that, at initiation of the start-up process, the starting delay applies to generate a start-up phase angle toward enabling reliable start up of the piezomotor, and, as the operating point is neared, the change in delay per selected time increment becomes progressively smaller and, at the operating point, the final delay applies to generate an operating phase angle toward enabling reliable operation of the piezomotor, or (iii) a preset combination of a linear gradient and a progressive curve, wherein the adjustable time-delay element includes a binary counter whose output is provided to the input of the phase comparator.

* * * * *